United States Patent [19]
Cheng

[11] Patent Number: 5,957,023
[45] Date of Patent: Sep. 28, 1999

[54] ADJUSTABLE SAWING DEVICE

[76] Inventor: Wen-Ho Cheng, P.O. Box 82-144, Taipei, Taiwan

[21] Appl. No.: 08/878,820

[22] Filed: Jun. 19, 1997

[51] Int. Cl.[6] ........................................... B26D 5/08
[52] U.S. Cl. .................................. 83/581; 83/766; 83/767
[58] Field of Search ............................. 83/581, 766, 767; 30/393, 394

[56] References Cited

U.S. PATENT DOCUMENTS

| | | | |
|---|---|---|---|
| 1,259,380 | 3/1918 | Eagleson | 83/766 |
| 1,458,951 | 6/1923 | Poole et al. | 83/766 |
| 2,598,979 | 6/1952 | Denney | 83/767 |
| 3,273,612 | 9/1966 | Keddie | 83/767 |
| 4,429,601 | 2/1984 | Taylor | 83/767 |
| 4,455,908 | 6/1984 | Keddie | 83/767 |
| 5,259,284 | 11/1993 | Chen | 83/766 |
| 5,259,286 | 11/1993 | Chen | 83/766 |
| 5,392,679 | 2/1995 | Wang | 83/766 |
| 5,575,191 | 11/1996 | Wang | 83/766 |
| 5,713,258 | 2/1998 | Keddie | 83/766 |

*Primary Examiner*—M. Rachuba
*Attorney, Agent, or Firm*—A & J

[57] ABSTRACT

An adjustable sawing device includes a base having a hole and a plurality of protuberances equidistant from a center of the hole, a guiding frame including a U-shaped member having a plurality of holes engageable with the protuberances, and a saw slidably mounted on the guiding frame, whereby the saw can be conveniently adjusted in angular position as required.

8 Claims, 7 Drawing Sheets

ADJUSTABLE SAWING DEVICE

BACKGROUND OF THE INVENTION

1. Field of the Invention

This invention is related to an adjustable sawing device and in particular to one which can be easily adjusted in angular position as required.

2. Description of the Prior Art

Conventionally, when a workpiece is to sawed, it must be first held securely by a vice on a worktable and then cut with a saw. However, when desired to cut the workpiece at an angular position, it is necessary to mark a line on the workpiece and then cut it along the line thereby causing much inconvenience in operation. Furthermore, it is very difficult to saw the workpiece exactly along the line. Hence, a so-called "complex sawing worktable" has been developed to obviate this drawback. Nevertheless, the table top of the "complex sawing worktable" is easily damaged, making it no longer precise and unfit for practical use.

Therefore, it is an object of the present invention to provide an improved adjustable sawing device which can obviate and mitigate the above-mentioned drawbacks.

SUMMARY OF THE INVENTION

This invention is related to an adjustable sawing device.

It is the primary object of the present invention to provide an adjustable sawing device which can be easily adjusted in angular position as required.

It is another object of the present invention to provide an adjustable sawing device which can be easily mounted on a worktable.

It is still another object of the present invention to provide an adjustable sawing device which is facile to assemble and stow.

It still another object of the present invention to provide an adjustable sawing device which is simple in construction.

It is a further object of the present invention to provide an adjustable sawing device which is fit for practical use.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numberals refer to identical or similar parts.

DETAILED DESCRIPTION OF THE PREFERRED EMBODIMENT

Figure 1:
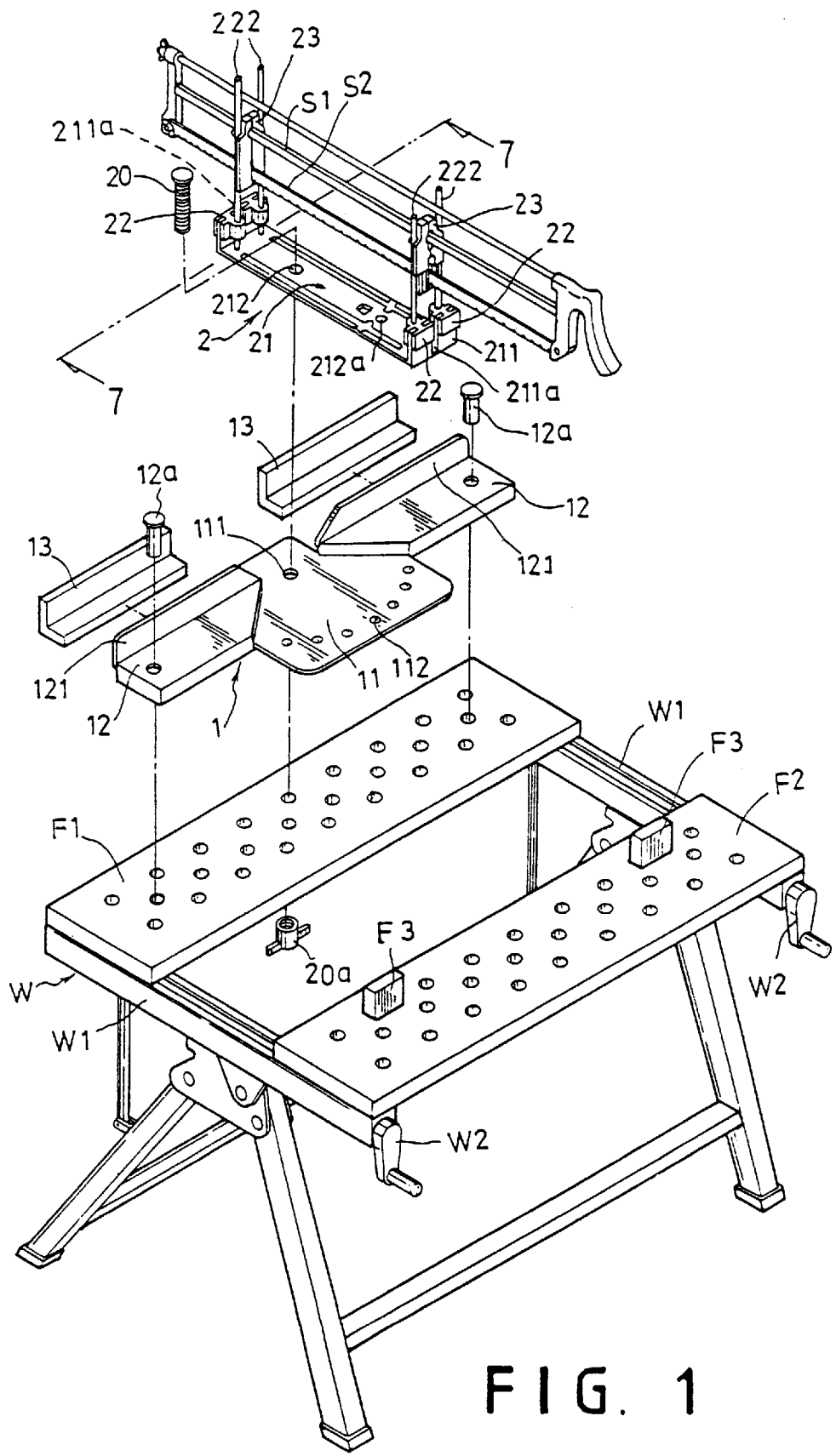
FIG. 1 is an exploded view of an adjustable sawing device according to the present invention.
Figure 2:
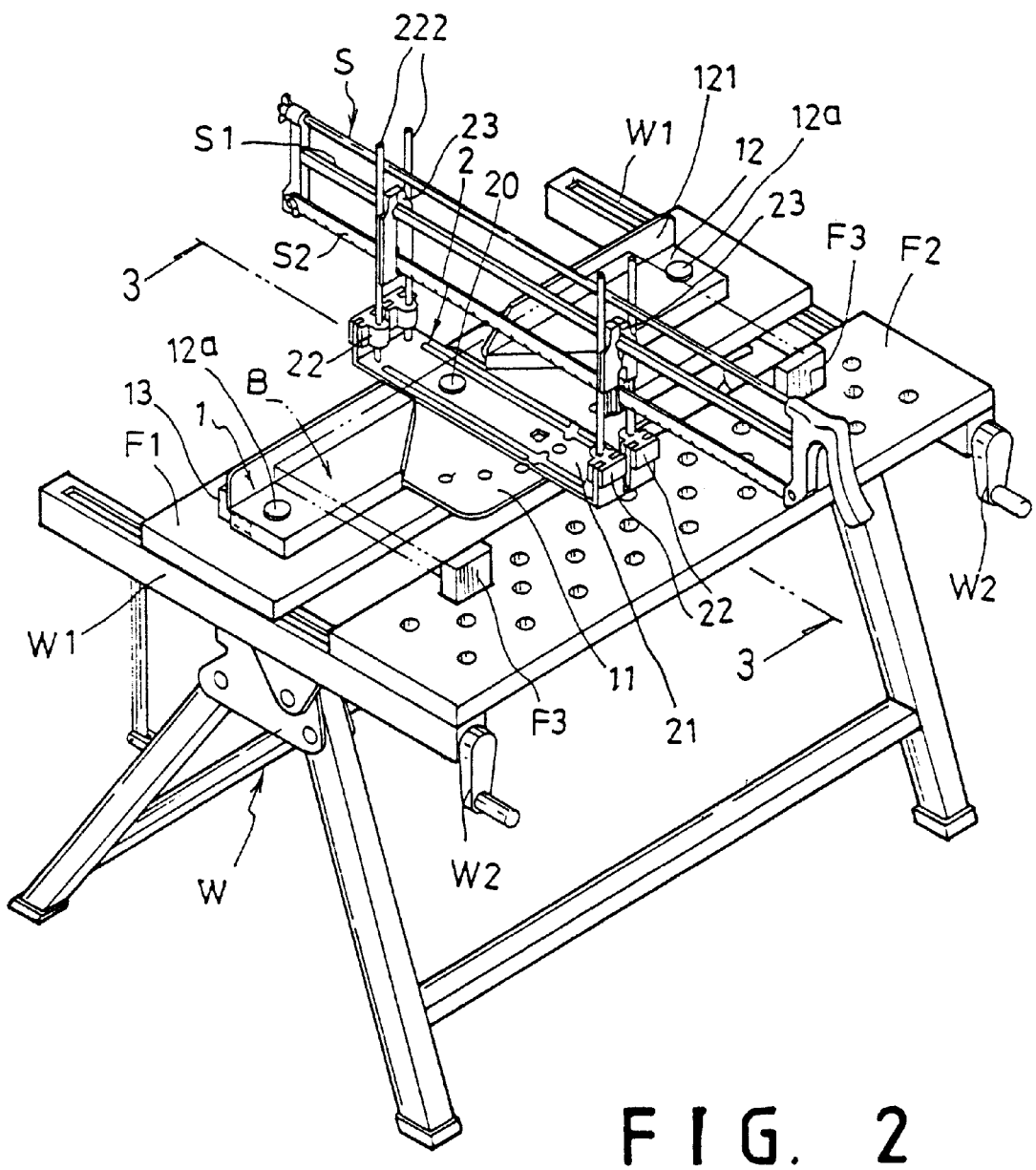
FIG. 2 is a perspective view of the adjustable sawing device.
Figure 3:
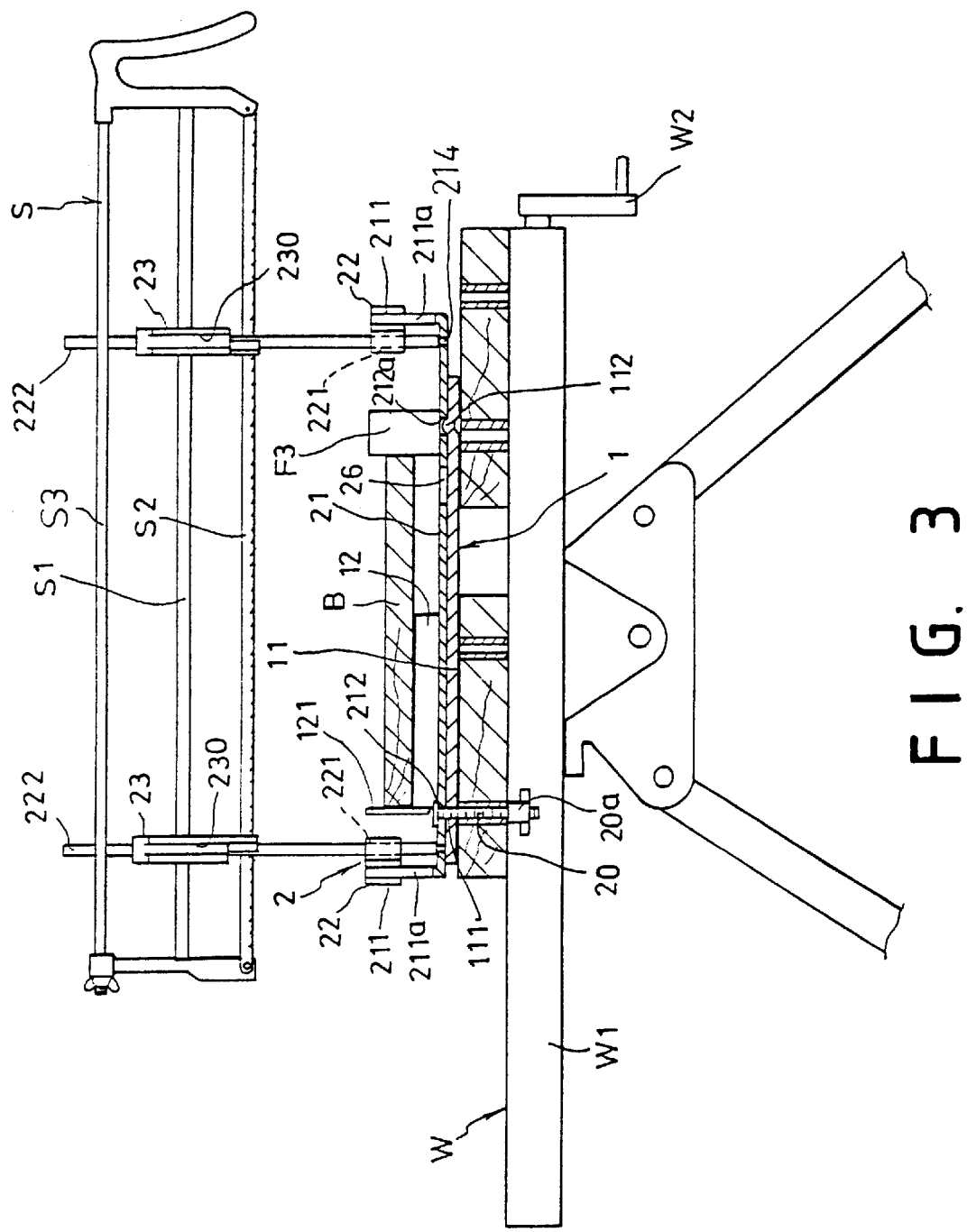
FIG. 3 is a sectional view taken along line 3—3 of FIG. 2.

With reference to the drawings and in particular to FIGS. 1, 2 and 3 thereof, the adjustable sawing device according to the present invention generally comprises a base 1, a guiding frame 2 and a saw S. The adjustable sawing device is adapted to be fixedly mounted on a worktable W.

The worktable W includes a pair of collapsible frames W1 between which are mounted a movable platform F and a stationary platform F2. The movable platform F1 is drivingly connected wtih two handles W2. The stationary platform F2 is provided with a pair of fixed blocks F3 thereon. The worktable W may be of any structure well known to the art and is not considered a part of the invention.

The base 1 includes a positioning portion 11 and two side portions 12, one at a side of the positioning portion 11. The positioning portion 11 is formed with a hole 111 and provided on the upper side with a plurality of protuberances 112 which are equidistant from the center 111a of the hole 111 (see FIG. 4). The side portion 12 has a flange 121 extending upwardly from the rear side thereof. The base 1 is fixedly arranged on the movable platform F1 of the worktable W by two bolts 12a extending through the two side portions 12 and the movable platform F1 to engage with a nut (not shown).

The guiding frame 2 includes a U-shaped member 21 having a pair of upwardly extending flanges 211 at both ends thereof. Between each pair of the upwardly extending flanges 211 there is a slot 211a. The U-shaped member 21 is fixedly installed on the positioning portion 11 of the base 1 by a bolt 20 extending downwardly through a hole 212 close to an end of the U-shaped member 21, the hole 111 of the positioning portion 11 of the base 1 and the movable platform F1 of the worktable W to engage with a nut 20a. The U-shaped member 21 is formed with a hole 212a close to the other end which is adapted to receive one of the protuberances 112 of the base 1, thereby facilitating the positioning of the U-shaped member 21 on the base 1. On each upwardly extending flange 211 there is mounted a connector 22 having a vertical through hole 221 for the passage of a vertical rod 222. The lower end of the vertical rod 222 is smaller in diameter and fitted into a hole 214 of the U-shaped member 21 so that the S vertical rod will be supported by the U-shaped member 21. A supporter 23 is slidably mounted on two vertical rods 222 which are arranged on each end of the U-shaped member 21. The supporter 23 is composed of a first and second members 23a and 23b each having a vertical groove 230 at the outer side for the passage of a vertical rod 222. The first member 23a is formed with a tenon 24a close to the upper end at the inner side, while the second member 23b has a mortise 25b adapted to engage with the tenon 24a of the first member 23a. The supporter 23 is formed with an opening 231a at the upper portion and a slit 232 at the lower portion.

The saw S is provided with an upper rod member S3, an intermediate rod member S1 mounted parallel and under the upper rod member S3, and a saw blade S2 mounted parallel and under the intermediate rod member S1. The saw S is engaged with the guiding frame 2 so that the intermediate rod member S1 is supported and guided by the openings 231a at the upper portion of the supporters 23, while the saw blade S2 passes through the slits 232 at the lower portion of the supporters 23. Consequently, the saw S can be moved up and down together with the supporters 23 along the vertical rods 222.

When desired to adjust the angular position of the saw S, it is only necessary to loosen the nut 20a, turn the U-shaped member 21 with respect to the base 1 so that the hole 212a of the U-shaped member 21 is engaged with a protuberance 112 of the base 1, and then fasten the nut 20a again.

In use, the workpiece (not shown) is first placed on the two side portions 12 of the base 11. Then, the handle W2 is turned to move the movable platform F1 to approach the stationary platform F2 until the workpiece is fastened between the flanges 121 of the base 11 and the fixed blocks F3 of the bench W.

Figure 4:
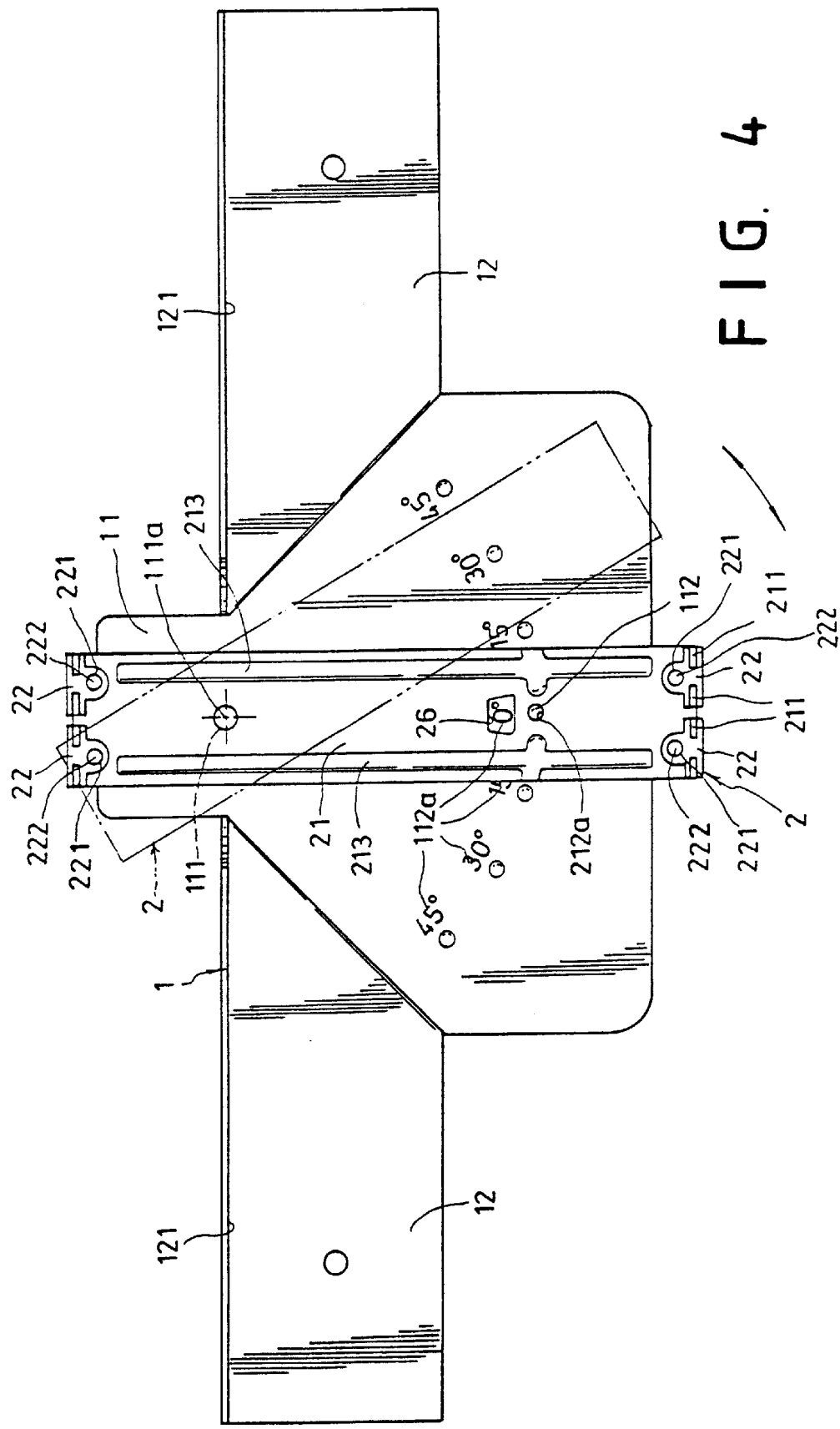
FIG. 4 is a top plan view of the adjustable sawing device.
Figure 5:
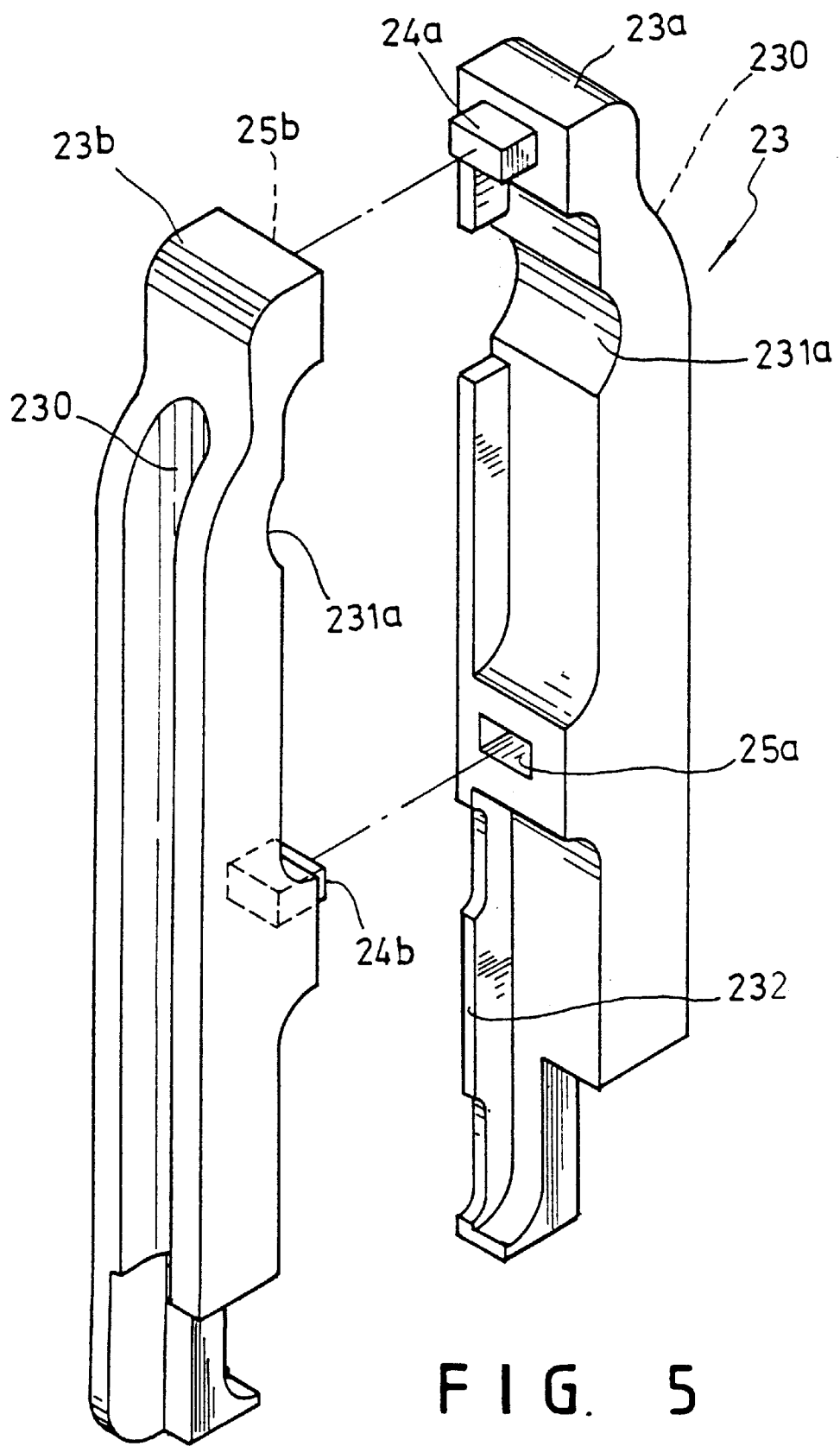
FIG. 5 is an exploded view of the saw frame supporter.
Figure 6:
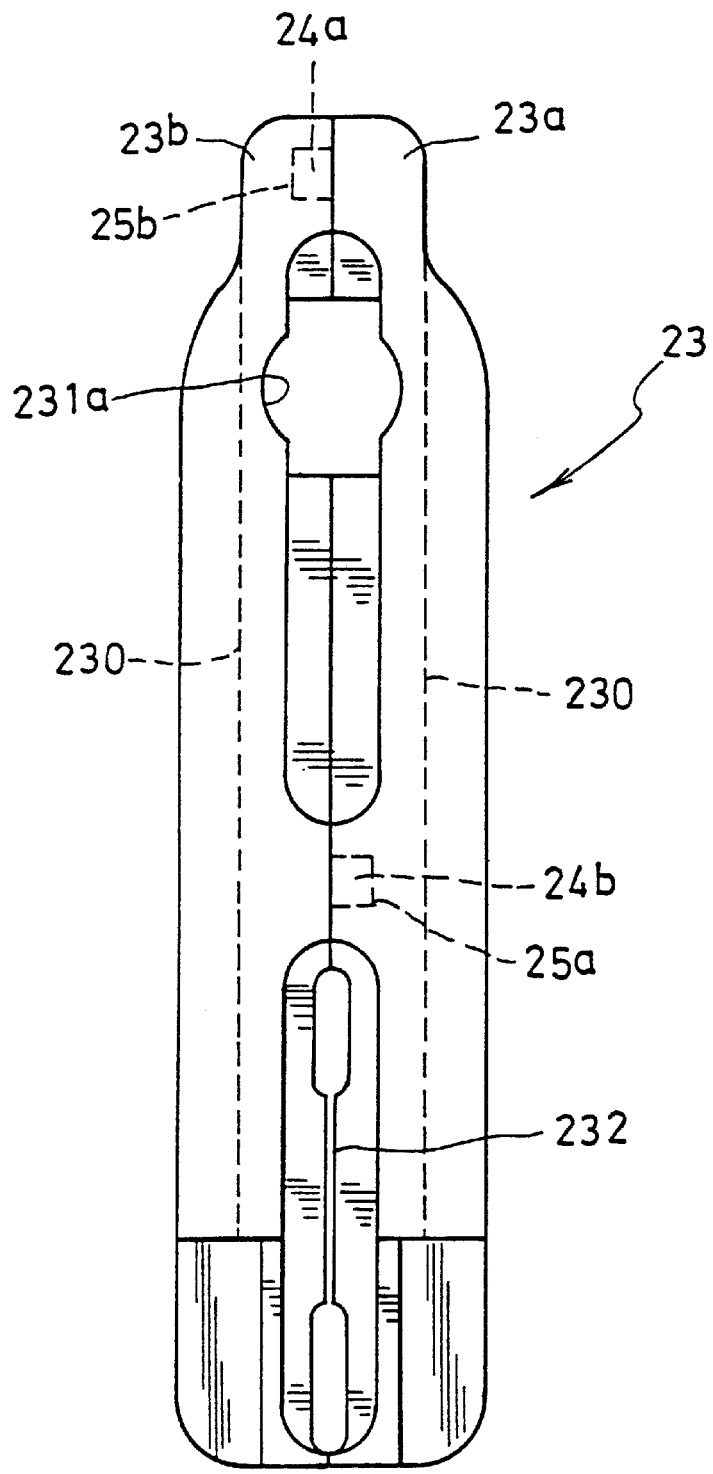
FIG. 6 is a front view of the saw frame supporter.
Figure 7:
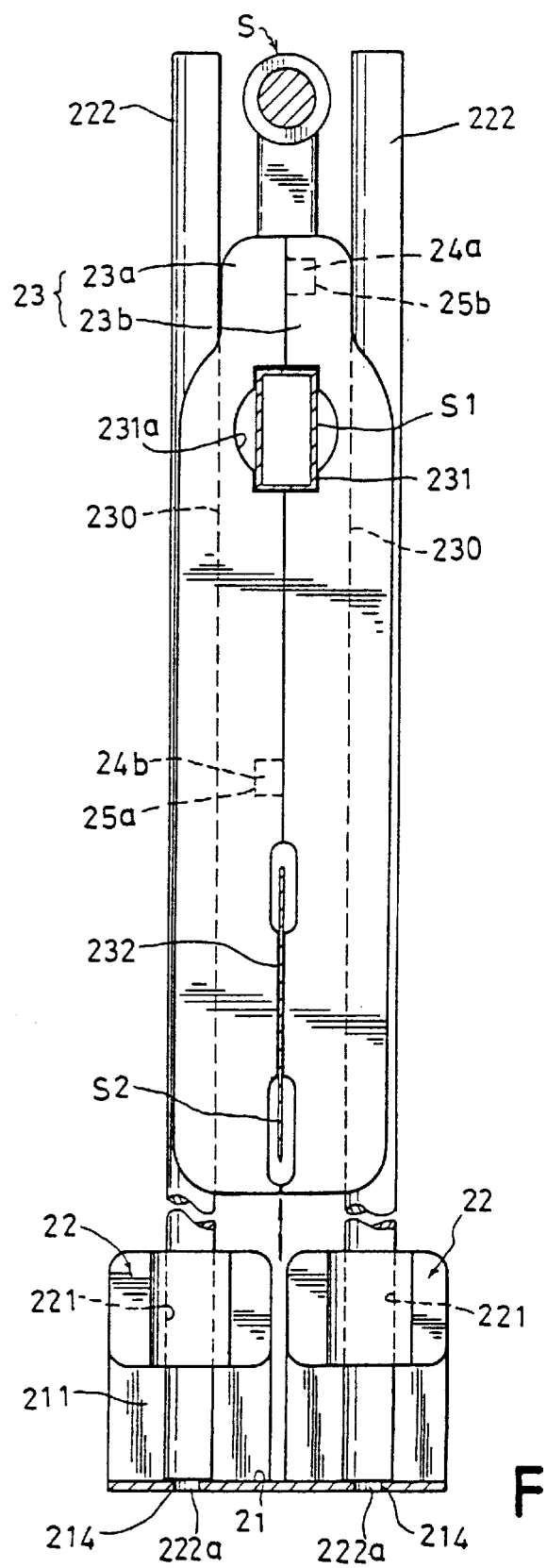
FIG. 7 is a sectional view taken along line 7—7 of FIG. 6.

As shown in FIG. 4, the protuberances 112 are marked with a set of degrees and the U-shaped member 21 has an opening 26 through which the angular position of the U-shaped member 21 with respect to the base 11 can be easily observed. An angular member 13 (see FIGS. 1 and 2) may be mounted on the base 11 to reinforce the side portions 12 of the base 11.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omit ing features that, from the standpoint of prior art, fairly constitute essential characteristics of the generic or specific aspects of this invention.

I claim:

1. An adjustable sawing device comprising:

a base having a hole and a plurality of protuberances equidistant from a center of said hole;

a guiding frame including a U-shaped member having two ends each formed with a pair of upwardly extending flanges between which there is a slot, four connectors each mounted on a respective one of said upwardly extending flanges and having a vertical through hole, two pairs of vertical rods each extending through a respective one of said connectors, each of said vertical rods having a lower end engaged with said U-shaped member, said U-shaped member being fixedly installed on said base and formed with a hole engageable with one of said protuberances of said base, and two supporters each slidably mounted on a respective pair of said vertical rods and having an upper portion formed with an opening and a lower portion formed with a slit; and a saw provided with an upper rod member, an intermediate rod member mounted parallel and under said upper rod member, and a saw blade mounted parallel and under said intermediate rod member, said intermediate rod member being supported and guided by said opening of said supporters, said saw blade extending through said slit of said supporters.

2. The adjustable sawing device as claimed in claim 1, wherein said base is provided with two side portions each having one side formed with an upwardly extending flange.

3. The adjustable sawing device as claimed in claim 1, wherein each of said protuberances is marked with a set of degrees.

4. The adjustable sawing device as claimed in claim 1, wherein said U-shaped member has a bottom formed with an opening.

5. The adjustable sawing device as claimed in claim 1, further comprising an angular member mounted on said base.

6. The adjustable sawing device as claimed in claim 1, wherein said supporters are each composed of two halves.

7. The adjustable sawing device as claimed in claim 1, wherein said supporters are each formed an outer side having a vertical groove in which is slidably fitted a respective one of said vertical rods.

8. The adjustable sawing device as claimed in claim 1, wherein said U-shaped member is fastened on said base by a bolt.

* * * * *